Figure 1:
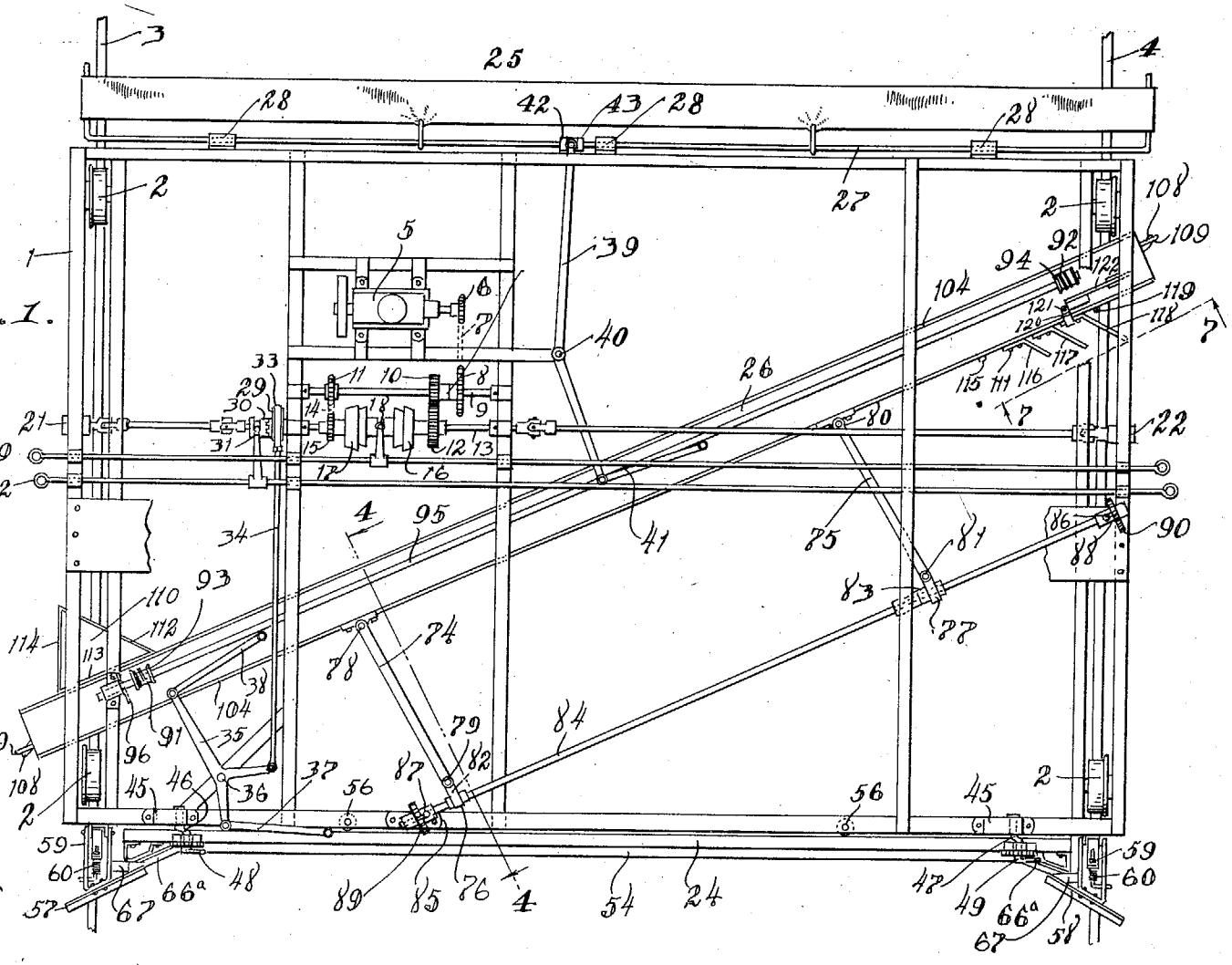

May 10, 1932. E. G. CARR Re. 18,455

CONCRETE ROAD FINISHING MACHINE

Original Filed Aug. 11, 1922 3 Sheets-Sheet 1

Inventor
Edward G. Carr.
Knox Hudson & Kent
Attys.

May 10, 1932. E. G. CARR Re. 18,455
CONCRETE ROAD FINISHING MACHINE
Original Filed Aug. 11, 1922 3 Sheets-Sheet 2
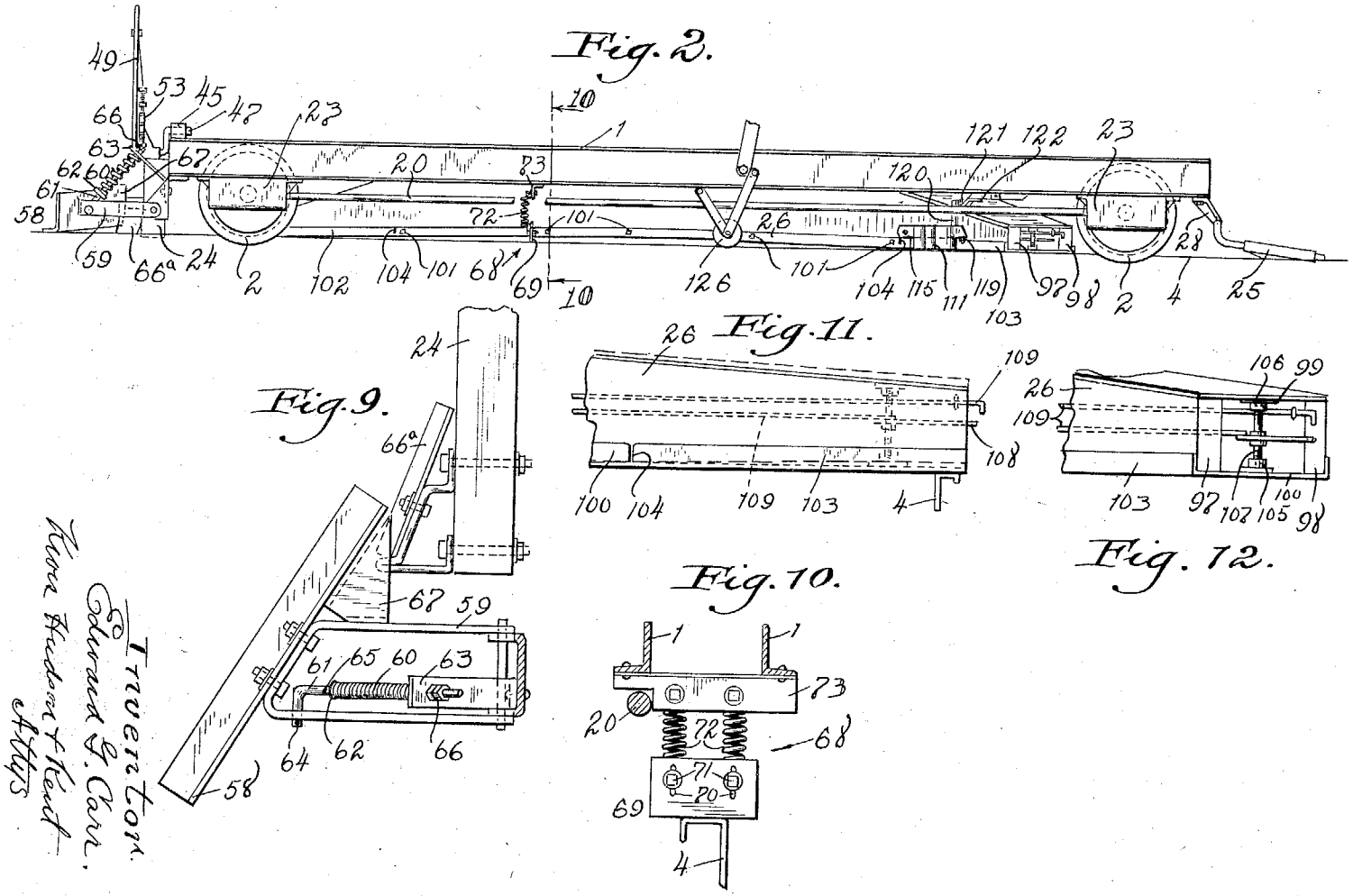
Inventor
Edward G. Carr.
Knox Hudson & Kent
Attys May 10, 1932. E. G. CARR Re. 18,455
CONCRETE ROAD FINISHING MACHINE
Original Filed Aug. 11, 1922 3 Sheets-Sheet 3
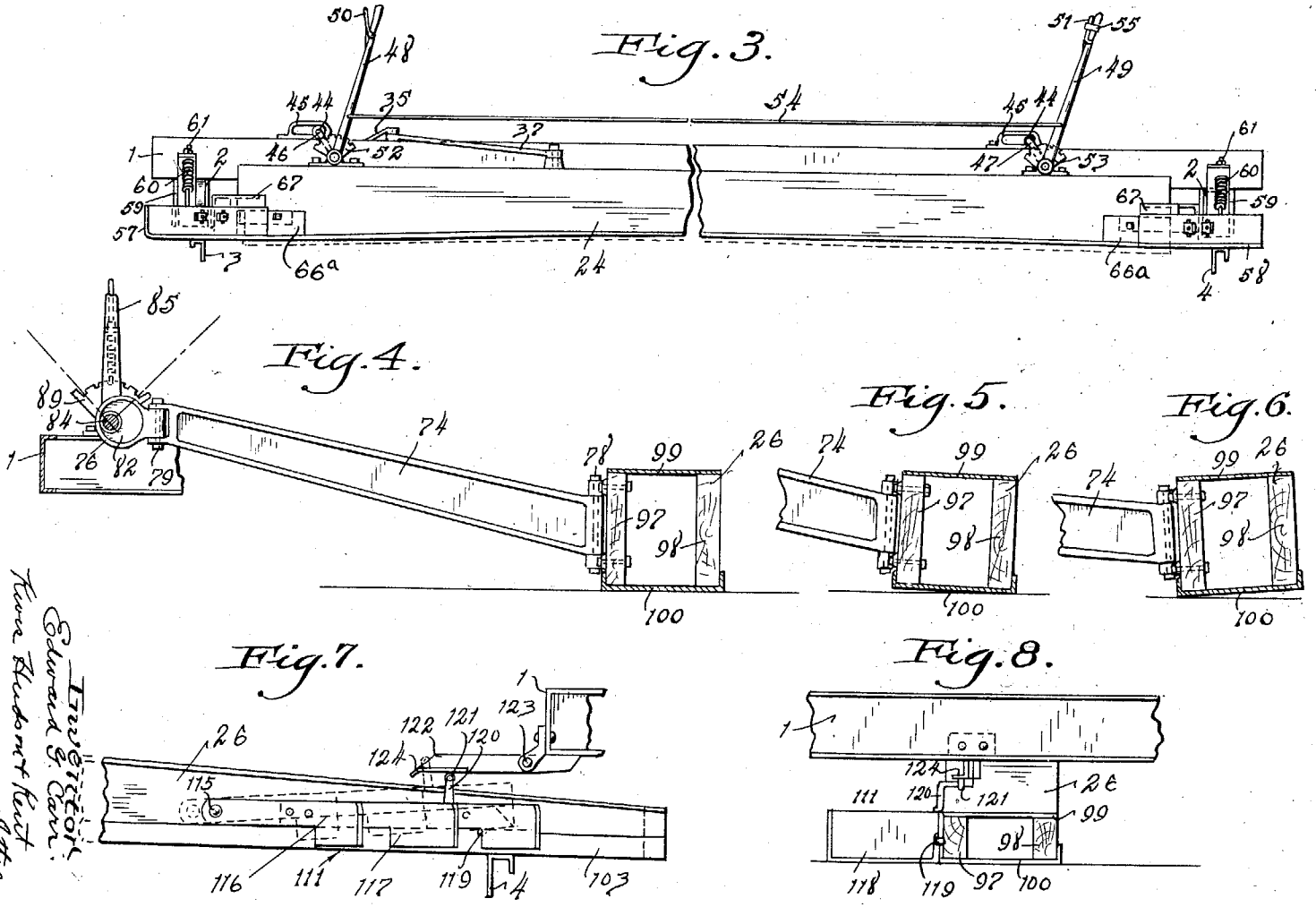
Inventor
Edward G. Carr.
Kuss Hudson & Kent
Attys.

Reissued May 10, 1932 Re. 18,455

UNITED STATES PATENT OFFICE

EDWARD G. CARR, OF CHICAGO, ILLINOIS, ASSIGNOR TO THE LAKEWOOD ENGINEERING COMPANY, OF LAKEWOOD, OHIO, A CORPORATION OF OHIO

CONCRETE ROAD FINISHING MACHINE

Original No. 1,611,412, dated December 21, 1926, Serial No. 581,043, filed August 11, 1922. Application for reissue filed December 20, 1928. Serial No. 327,423.

This invention relates to concrete road finishing machines. The general object of the invention is to improve the construction and operation of concrete road finishing machines in the manner to be hereinafter described and claimed. A more specific object is to provide in a road finishing machine a templet or screed member which is so arranged that a downward pressure component will be exerted thereby upon the concrete, thus increasing the pressure of such member upon the concrete.

Referring to the drawings which accompany this specification and form a part hereof, which drawings illustrate an embodiment of the invention and on which the same reference characters are used to designate the same parts wherever they may appear in each of the several views, Fig. 1 is a plan view of a concrete road finishing machine, parts being broken away; Fig. 2 is a side elevation of parts of the machine; Fig. 3 is a front elevation of parts of the machine; Fig. 4 is a vertical section on an enlarged scale taken on line 4—4 of Fig. 1 looking in the direction indicated by the arrows; Figs. 5 and 6 are views similar to Fig. 4 but showing the templet or screed member tilted to different positions; Fig. 7 is a vertical section taken on line 7—7 of Fig. 1 looking in the direction indicated by the arrows; Fig. 8 is an elevation of parts of the machine, the line of sight being directed longitudinally of the templet or screed member shown in Fig. 4; Fig. 9 is a plan view of an end of another templet or screed member and associated parts; Fig. 10 is a vertical section taken on line 10—10 of Fig. 2 looking in the direction indicated by the arrows; Fig. 11 is an elevation of parts of the templet or screed member shown in Fig. 4; and Fig. 12 is a perspective view of an end of the same member.

The reference numeral 1 designates a frame of any suitable construction which is mounted on wheels 2. The wheels 2 are adapted to run upon the forms 3 and 4 and may be rotated by the motor 5 to propel the machine in either direction. The motor 5 is illustrated by the drawings as an internal combustion motor or engine, which runs, or turns over, in only one direction; and, to provide for the propulsion of the machine in either direction, a sprocket wheel 6 and sprocket chain 7 can rotate the sprocket wheel 8, the shaft 9, the gear 10 and the sprocket wheel 11. The sprocket wheel 8, the gear 10 and the sprocket wheel 11 are all connected to the shaft 9 in any suitable manner so that these several parts rotate as a unit. The gear 10 meshes with the gear 12 which is a loose gear on the shaft 13, and the sprocket wheel 15, which is a loose sprocket wheel on the shaft 13, is connected with the sprocket wheel 11 by the sprocket chain 14. The gear 12 is provided with a clutch member 16 and the sprocket wheel 15 is provided with a clutch member 17. It will, of course, be understood that the gear 12 and the sprocket wheel 15 are restrained from longitudinal movements on the shaft 13, while being free to permit all relative movements of rotation. A clutch 18 is secured to the shaft 13 so as to rotate therewith while being movable longitudinally thereof, and the clutch 18 may be moved by a clutch-rod 19 into engagement either with the clutch member 16 or the clutch member 17, or the clutch 18 may be moved to an intermediate or neutral position where it is disengaged from both of the clutch members 16 and 17. With the motor 5 running, it is thus possible to move the clutch 18 to such position that the shaft 13 can be rotated in either direction, or can be prevented from being rotated so that the machine can be propelled forward or backward or can be stopped. The shaft 13 is extended to rotate longitudinal shafts 20, one of which is arranged at each side of the machine by a gear mechanism contained in housings 21 and 22 while the longitudinal shafts 20 are geared to the wheels 2 by a gear mechanism contained in journal boxes 23.

The frame 1 supports a templet or screed member 24 intended principally for spreading the concrete and a float or finisher 25. A second templet or screed member 26, primarily intended for smoothing the concrete but also serving, to a certain extent, as a "strike-off" or spreading member, is located between the templet or screed member 24 and the float 25 and is so arranged that it may be supported by the forms 3 and 4 or may be raised from the forms and be supported from the frame 1 of the machine.

The float or finisher 25 consists of a piece of textile fabric or other suitable material secured to a frame 27. The frame 27 is supported by bearings 28 which are secured to the frame 1 and the frame 27 is both reciprocable and rotatable in the bearings 28 so that it can be reciprocated longitudinally or can be turned up or down to remove the float 25 from the concrete surface or to place it in contact with the concrete surface.

The templet or screed member 24, the float or finisher 25 and the second templet or screed member 26 are severally reciprocable longitudinally of themselves substantially transversely of the roadway and may be reciprocated in the following manner. A crank device, such as an eccentric 29, for example, may be loosely mounted on the shaft 13 but restrained from longitudinal movements with respect thereto and be provided with a clutch member 30 adapted to be engaged by a clutch 31 which is splined, for example, to the shaft 13. The clutch 31 may be actuated by a clutch-rod 32. An eccentric strap 33 and a connecting rod 34 communicate motion to a motion transmitting device 35, which is illustrated in the drawings as a three-armed lever pivoted to the frame 1 by a pivot 36. The templet or screed member 24 is connected with the motion transmitting device 35 by a link 37 which is loosely pivoted at both ends to permit the member 24 to be reciprocated in different positions of elevation. The other templet or screed member 26 is also connected with the motion transmitting device 35 by a link 38, which is loosely pivoted at both ends to permit the member 26 to be reciprocated or raised or lowered. A lever 39 is pivoted to the frame 1 by the pivot 40 and is loosely pivotally connected with the member 26 by a link 41 at one end while its other end is connected with the frame 27 in any suit manner as, for example, by being bifurcated and straddling the frame 27 between two collars 42 and 43 which are secured to the frame 27. The extent of movement of the templet or screed members 24 and 26 and the float or finisher 25 in their several longitudinal reciprocations can be readily provided for by the distances the links 37 and 38 are located from the pivot 36 and the distance the link 41 is located from the pivot 40.

It is preferred that the templet or screed member 24 reciprocate horizontally since its purpose is to initially spread or "strike off" the concrete for the lower courses which has been placed in the roadway between the forms by the mixing machine. This member is preferably supported upon anti-friction rollers 44 which run in guides 45 secured to the frame 1, such rollers being placed upon the horizontal ends of cranks 46 and 47 upon which the member 24 is hung. The cranks 46 and 47 are provided with operating levers 48 and 49 which have hand grips 50 and 51 to control pawls which are adapted to seat in notches in sectors 52 and 53 which are secured to the member 24. It will be evident that by manipulating the operating levers 48 and 49, the cranks 46 and 47 can be turned so as to elevate or lower the member 24. The operating levers 48 and 49 are connected for simultaneous movements by a rod 54 so that the templet or screed member can be raised or lowered from either side of the machine to suit the convenience of the operator, and a ring 55 may be slipped over one operating lever and its hand grip to hold the pawl for that hand grip out of engagement with the sector for that particular operating lever. Anti-friction rollers may be provided to take thrust from the templet or screed member 24 and in Fig. 1 of the drawings two such anti-friction rollers 56 are shown mounted in the frame 1. The member 24 is illustrated by the drawings as shorter than the distance between the forms 3 and 4 and the extent of vertical movement provided for by the cranks 46 and 47 is sufficient to enable the member 24 to be lowered between the forms or to be raised above the forms. With such a construction the templet or screed member 24 can be lowered between the forms to spread a sub-base of concrete for a brick or stone pavement, or for any spreading purpose whatever, and at the same time, this templet or screed member can be raised or lowered to spread material to the height of the forms, or above. The vertical lift of the member 24 should be sufficient so that it can be raised above the surface which it has formed when spreading so as to clear the same and leave the surface undisturbed when the machine is running back over that portion of the roadway.

The reference numerals 57 and 58 designate plows which also serve as form cleaners which are preferably yieldably secured to the frame 1. These plows 57 and 58 extend from outside the forms inwardly and backwardly so as to be at all times at their inner ends in front of the ends of the templet or screed member 24, notwithstanding the fact that such member is being reciprocated. The plows are secured to pivoted U-shaped frames 59 and are yieldably held down by spiral springs 60 which surround links 61 and are held between collars 62 and brace members 63. The links 61 have bent ends which pass through holes in the U-shaped frames 59 and may be held in place by cotter pins 64. The collars 62 may be held in position by cotter pins 65. The links 61 pass through holes in the brace members 63 and are provided with nuts 66 to limit the downward movements of the plows so that the same can be set to just clean the forms without bearing or scrubbing thereon.

The templet or screed member 24 is provided with rakers 66a at each end which incline inwardly and backwardly to prevent material being pushed out over the forms as the templet or screed member 24 is reciprocated and when it is working at the height of the tops of the forms or above. When this member is working at the height of the tops of the forms or above, the rakers 66a are, in part, behind the plows 57 and 58 and it will be evident that the member, as it is reciprocated, cannot push material off over the forms. In other words, the ends of the templet or screed member 24 cannot push material endwise because the plows and rakers move the material to points inside the ends of such member. The plows 57 and 58 are provided with parts 67 to be contacted by the member 24 to lift the plows when such member is elevated to an out-of-the-way position.

The reference numeral 68 designates a form scraper which is universally yieldable in all directions and the purpose of which is to scrape any pebbles, sand, or cement mortar or other obstructions from the forms in advance of the second templet or screed member 26 which, in the present embodiment, is intended to ride accurately upon the forms. The form scraper 68 is illustrated by the drawings as composed of a flat plate 69 provided with elongated slots 70 for bolts 71 which adjustably secure it to spiral springs 72 bolted to a piece of angle iron 73 which is fastened to the frame 1. The second templet or screed member 26 is positioned lengthwise of the machine intermediate the member 24 and the finisher 25 by radius rods 74 and 75, which are pivoted to the member 26 and to eccentric straps 76 and 77 by vertical pivots 78, 79, 80 and 81. The eccentric straps 76 and 77 surround eccentrics 82 and 83 which form convenient crank members for tilting the templet or screed member 26. The eccentrics 82 and 83 are fast on a shaft 84 which is supported by the frame of the machine and it will be evident that by rocking the shaft 84 the under or concrete engaging surface of the templet or screed member 26 may be placed flat or horizontal as shown by Fig. 4, or may be tilted upwardly as shown by Figs. 5 and 6 depending, of course, upon the direction in which the machine is moving. The member 26, when in use will be supported by the forms, and assuming a direction of movement of the machine to advance such member from right to left when looking at Figs. 4 and 5 of the drawings, the templet or screed member may be kept flat as shown by Fig. 4 or its leading edge may be raised as shown by Fig. 5 to smooth and compress the concrete. There may be certain circumstances as, for example, when the concrete is piled too high when it is desirable to arrange or tilt the member 26 so that its following edge will be elevated as shown by Fig. 6, still assuming the machines be moving from right to left, whereby its leading edge will have a more pronounced tendency to push or spread the concrete rather than tending to compress and smooth the same.

It is not inaccurate to describe the tendency of the member 26 when in the position shown by Fig. 6 as a digging tendency, bearing in mind, however, that such member in the present embodiment is restrained from downward movement by the forms upon which it rests, but that it could move downward to the forms if it were elevated above the same by the concrete. When the member 26 is arranged as shown in Fig. 4 with the bottom surface thereof lying in a horizontal plane and the front face thereof disposed in substantially a vertical plane, the downward unit pressure of the member upon the concrete is dependent upon the weight of the templet or screed member itself. During forward movement of the member, the concrete will pile up against its front face and thus cause a reaction offsetting the kinetic energy of the forward movement by the horizontal pressure of the concrete in front of the member. Also there is no vertical component pressure created when the templet or screed member is used in this position. However, when the member 26 is in the position shown in Fig. 5 with its forward or leading edge upwardly tilted, the kinetic energy of forward movement is resolved by the pressure of the concrete in front of the member into a downward action on the front of the templet or screed which, in turn, must be reacted against by the concrete beneath the member and thus increase the actual pressure on such portion of the concrete. It is clear that after the heavy head of concrete has been spread by a templet or screed member tilted, as in Fig. 6, it will impart a final pressure to the concrete and will also exert a wiping, smoothing or finishing action thereon. The tilting of the leading edge of the screed or templet gives an additional crowding, compressing or squeezing action not present when the bottom and front side of such member are in the relationship shown in Fig. 4, and results in the member gripping a transverse section of the concrete in a manner which materially adds to the agitation and working of the mass and thus brings up mortar for the final finish and eliminates excess water and air voids. Of course substantially the same results would be obtained were the bottom of the member arranged in a horizontal plane and the front side thereof disposed at a rearwardly inclined acute angle thereto either for its full extent or for a portion of its extent adjacent the bottom surface. Since under forward movement of the member there would be a downward component created by the concrete built up in front of the member which would provide the added pressure and increase the agitation or kneading action thereof. It should be stated at this time that although in the embodiment disclosed and described herein the templet or screed member 26 is described as being principally intended for smoothing the concrete which has been substantially spread by the member 24, that the principle just above stated, namely arranging the templet or screed member so as to create a downward pressure component and thereby increase the pressure of the member upon the concrete, could be applied with equally satisfactory results in a machine of the type employing only a single screed or templet which performs the dual functions of a spreading and smoothing member.

The shaft 84 can be rocked and the member 26 tilted by the hand levers 85 and 86 which are secured to the shaft 84 and which may be retained in selected positions by hand grips 87 and 88 which control pawls adapted to engage in notches in sectors 89 and 90 which are fixed to the frame of the machine. One pawl can be held disengaged from its sector by a ring slip-over around the lever and its hand grip in the manner already described in connection with the operating levers and hand grips for the screed or templet member 24. The templet or screed member 26 can be raised from the forms and the concrete and be supported from the frame 1 of the machine by chains 91 and 92 which are attached thereto and to drums 93 and 94 which are secured to a shaft 95 supported by the frame 1 of the machine. The shaft 95 can be rotated in any suitable or convenient manner and retained in a predetermined position with the member 26 raised or elevated by any suitable mechanism as, for example, a pawl, hand grip, and lever mechanism, not shown, coacting with a fixed sector 96 in the same manner as the shaft 84 is operated, it being understood that the drums 93 and 94 with such a construction are large enough to wind up the chains 91 and 92 to the extent required for the rocking movement which can be given to the shaft 95. When the member 26 is lowered onto the forms, the chains 91 and 92 will be slack enough to permit longitudinal reciprocations thereof. The templet or screed member 26 is illustrated by the drawings as being disposed obliquely to the direction of motion of the machine, or obliquely with respect to the forms 3 and 4, and when the machine is in motion and moving in either direction the member 26 will tend to move material sideways, and one of the objects of this invention is to move material away from the forms towards the center of the road to keep maintaining the crown of the road. Both of the members 24 and 26 have their under surface arched or cambered to conform to the crown of the road but it is difficult to handle cement mortar without rubbing out the crown of the road. The templet or screed member 26 is illustrated by the drawings as composed of two planks 97 and 98 with a top 99 to prevent material from accidentally getting into the space between the planks. A bottom 100 is secured to the lower edges of the planks. As a matter of convenience I prefer to use channel iron for the bottom 100 as the flanges of the channel iron can be fastened to the planks by fastenings 101, leaving the under surface of the channel iron perfectly smooth. The channel iron is not fastened to the planks clear to the ends thereof but is free at its ends which are designated by the reference characters 102 and 103 so that its ends can bend and warp. The ends 102 and 103 may be made more flexible by being cut, as indicated by the reference numeral 104, through the flanges of the channel iron or separate, renewable pieces can be used for the ends. Screwthreaded bosses 105 are secured to the ends of the bottom 100 and screwthreaded bosses 106 are secured to the top 99 and a screw 107, with right-hand threads at one end and with left-hand threads at its other end is provided at each end to engage with the correspondingly screwthreaded bosses 105 and 106.

It is evident that by turning the screws 107 the ends 102 and 103 of the bottom can be moved away from the top 99 and the planks 97 and 98. If the member 26 is resting upon the forms and a screw 107 is turned in the direction to separate the top and the bottom, the top 99 and the planks at that end will be raised or elevated. Each screw 107 is provided with a lever 108 for turning it and a rod 109 is also connected with the lever 108 and extends between the planks 97 and 98 to the opposite side of the machine so that both screws can be operated from either side of the machine. The operation is as follows. Looking at Fig. 1 of the drawings and assuming that the machine is advancing with the templet or screed member 24 in front of the member 26, the screw 107 at the right-hand end of the member 26 will have been turned to raise the right-hand end of such member to render it inactive on the down slope of the crown of the road and the left-hand half of the member will tend to crowd material away from the form 3 towards the center of the road and so tend to build up the crown of the road or maintain the crown of the road. If the direction of the movement of the machine be reversed, the float 25 will be turned up out of contact with the concrete, the screw at the right-hand end of the member 26 will be turned to lower that end of the member and the screw at the left-hand end of the member will be turned to raise the left-hand end of such member to render it inactive. In this manner, first one side of the road can be operated upon and then the other and the crown of the road be preserved.

The reference numerals 110 and 111 designate rakers connected to the member 26 to make material away from the forms towards the center of the road. The raker 110 is illustrated as a triangular piece of sheet metal with upturned edges 112, 113 and 114 and one upturned edge is fastened to a flange of the end of the channel bar bottom 100. The size of the raker 110 should be such that its edge 114 never passes to the inside of the form during the reciprocations of the member 26 and its edge 112 should be oblique to the form as clearly shown by Figure 1 of the drawings. The raker 111 is illustrated by the drawings as pivoted by a pivot 115 to the member 26 and it is provided with oblique teeth or rakes 116, 117 and 118 of different lengths and a stop 119 limits the downward movement of the rakes or teeth to just above the lower surface of the channel iron bottom 100. An arm 120 is provided with an anti-friction roller 121 and the frame 1 has a track member 122 pivoted to it by a pivot 123. The track member 122 is provided with a track 124 which is bent downwardly at its outer end and which is shorter than the reciprocating stroke of the templet or screed member 26. The track member 122 is extended beyond the pivot 123 to form a stop arm 125 which projects under the frame 1 and prevents the track 124 from being depressed below a predetermined position while permitting it to be elevated above that position. When the member 26 is being reciprocated to the right, looking at Figs. 1, 2 and 7 of the drawings, the anti-friction roller 121 will be higher than the downwardly bent end of the track 124 and will ride up over the track 124, lifting the teeth 116, 117 and 118, so that there will be no possibility of the teeth contacting with any material which might be otherwise contacted with. When the member 26 has nearly reached the limit of its movement to the right, the anti-friction roller 121 will reach the end of the track 124 and drop over the end of the same letting the raker 111 drop against the stop 119. On the reciprocation of the member 26 in the opposite direction, the anti-friction roller 121 will run under the track 124 and will elevate the same when the downwardly bent end of the track is reached and pass into the clear. The track member 122 will drop until its stop arm 125 contacts with the frame 1, and the parts will then be in position for repeating the cycle of operations. The action of the raker 111 will be to lift over and rake back towards the center of the road.

The action of the raker 110 will be to rake material, which may be high towards the center of the road and there will be no tendency to push material over the form because the edge 114 is never inside the form.

The reference numeral 126 designates a skid-jack which is now well known and does not need to be specifically described here.

The operation of the machine will be readily understood from the foregoing description. The templet or screed member 24 can be lowered between the forms for the purposes described, or can be set at the level of the forms, or above the level of the forms. When the member 24 is raised to its extreme position, the plows 57 and 58 will be lifted. When the machine is being run backward, the float or finisher 25, and its frame 27, will be turned up in the customary manner. The screws 107 do not fit within the bosses 105 and 106 so tightly as to prevent warping or twisting of the ends of the bottom 100 of the templet or screed member 26 and these ends will lie flat on the forms and the raker 110 will also lie flat on the form.

The trailing end of the templet or screed member 26 will be raised by its screw 107 to render the part of the member over the down slope from the crown inactive while the leading end of the member will incline according to the crown on its side of the road and will hug the form on its side of the road.

The under side of the templet or screed member 24, while arched to the crown of the road, is preferably flat or horizontal lengthwise of the road so as to act in addition to its spreading function also as a smoothing templet or screed.

In other words, its front lower edge will determine a surface by spreading action while its under surface will act with a smoothing action upon the surface made or determined. This is of special importance when the templet or screed is being used on concrete below the level of the tops of the forms.

Although in the embodiment disclosed herein a spreading templet or screed and a smoothing templet or screed are shown and described, it should be understood that the invention is not to be limited to this particular arrangement, since a single templet or screed member may perform both functions or a plurality of such members may be used each of which performs both functions in whole or in part. It should also be understood that the invention is to be limited to the embodiment shown only insofar as the appended claims so limit it.

Having thus described my invention I claim:

1. In a concrete road finishing machine adapted to be advanced along a roadway, a templet or screed member extending substantially the entire width of the roadway and reciprocable transversely of the roadway as a unit and having its leading upstanding face rearwardly inclined with respect to the vertical whereby a head of concrete built up in front of the member as the machine advances will exert a downward pressure component upon the concrete beneath the member from end to end thereof.

2. In a concrete road finishing machine adapted to be advanced along a roadway, a templet or screed member extending substantially the entire width of the roadway and reciprocable transversely of the roadway as a unit and having its under surface inclined with respect to the horizontal from end to end thereof.

3. In a concrete road finishing machine adapted to be advanced along a roadway, a templet or screed member reciprocable substantially transversely of the roadway, and means for tilting said member to selectively arrange its under surface upwardly inclined with respect to the horizontal and either its leading or following edge elevated.

4. In a concrete road finishing machine adapted to be advanced along a roadway, a templet or screed member reciprocable substantially transversely of the roadway, and means for tilting said member to arrange its under surface inclined with respect to the horizontal.

5. In a road finishing machine, the combination with a smoothing templet adapted to engage with the road forms at both of its ends, means for reciprocating said templet longitudinally of itself, and means for rendering a part of said templet inactive.

6. The combination with a smoothing templet adapted to be reciprocated longitudinally of itself, and provided with means to contact with forms, of means for elevating one end of the templet while leaving the other end of the templet in position to work on the other side of a road.

7. The combination in a concrete road finishing machine, of a smoothing templet including a rigid part adapted to contact with and work upon the concrete, and an end part relatively movable vertically with respect to said rigid part, means to vary the relative positions of said parts, and means to reciprocate said templet longitudinally of itself.

8. The combination with a smoothing templet, of means to reciprocate the templet longitudinally of itself, and means for tilting the templet transversely with respect to its length so as to work upon concrete with an edge of the templet.

9. The combination in a concrete road finishing machine, of a smoothing templet, means for reciprocating the templet longitudinally of itself, a raker, and means for elevating the raker when the templet is moving in one direction.

10. The combination in a concrete road finishing machine, of a smoothing templet, radius rods, means for reciprocating the templet longitudinally of itself, means for raising an end of the templet independently of the other end, means for tilting the templet transversely of itself so as to work concrete with an edge of the templet, and means for elevating the templet from the forms.

11. The combination in a concrete road finishing machine, of a reciprocatable spreading templat, a reciprocatable smoothing templet, and a reciprocatable float or finisher in such close relationship to each other that the concrete is in the same unset plastic condition under the smoothing templet and the float or finisher as when it has been passed by the spreading templet.

12. The combination in a concrete road finishing machine, of plows, a reciprocatable spreading templet, an oblique reciprocatable smoothing templet adapted to rest upon the forms, means for tilting the smoothing templet, means for rendering a part of the smoothing templet inactive, a float or finisher, and means for reciprocating the spreading templet, the smoothing templet and the float or finisher.

13. The combination with a concrete road finishing machine, of a form cleaner plate, spiral springs for supporting the cleaner plate from the machine, and means for adjusting the form cleaner plate with respect to the form.

14. The combination with a frame adapted to be supported by forms, of a reciprocatable spreading templet of less length than the width between the forms, and means for setting the spreading templet to different elevations.

15. The combination with a frame adapted to be supported by forms, of a reciprocatable spreading and smoothing templet of less length than the distance between the forms, rakers at the ends of the templet, means for reciprocating the templet longitudinally of itself, and means for changing the elevation of the templet.

16. The combination with a frame adapted to be supported by forms, of a reciprocatable spreading templet, plows, means to reciprocate the spreading templet, means to change the elevation of the spreading templet and to elevate the plows.

17. The combination with a concrete road finishing machine, of pivoted plows, means for limiting the movements of the plows towards the forms, and yieldable means for normally holding the plows in predetermined positions.

18. In a concrete road finishing machine adapted to be advanced along a roadway at the sides of which are suitable rails upon which the finishing machine may be advanced, a templet or screed member adapted to rest upon the side rails and to be reciprocated substantially transversely of the roadway as a unit, said screed having its under surface inclined with respect to the horizontal.

19. In a concrete road finishing machine adapted to be advanced along a roadway at the sides of which are suitable tracks upon which the machine may advance, a templet or screed member mounted upon said machine and adapted to rest upon the said tracks and to be reciprocated substantially transversely of the roadway, said member being tilted so as to have its under surface inclined and one of its longitudinal edges elevated.

20. The combination, in a concrete road finishing machine, of a smoothing templet, means for reciprocating the templet longitudinally of itself, a raker, and means alternately rendering said raker ineffective and effective during the reciprocation of the templet in opposite directions.

EDWARD G. CARR.